United States Patent [19]

Kondo et al.

[11] Patent Number: 5,153,255
[45] Date of Patent: Oct. 6, 1992

[54] PROCESS FOR PREPARING A RUBBER COMPOSITION HAVING TWO DIFFERENT MOLECULAR WEIGHTS

[75] Inventors: Makoto Kondo, Kameyama; Isao Sugita, Suzuka; Fumio Tsutsumi, Chiba; Isao Furuta, Yokkaichi, all of Japan

[73] Assignee: Japan Synthetic Rubber Co., Ltd., Tokyo, Japan

[21] Appl. No.: 767,548

[22] Filed: Sep. 27, 1991

Related U.S. Application Data

[63] Continuation of Ser. No. 540,278, Jun. 19, 1990, abandoned.

[30] Foreign Application Priority Data

Jun. 26, 1989 [JP] Japan .................. 01-160822

[51] Int. Cl.⁵ ............. C08L 9/06; C08F 236/10; C08K 3/04
[52] U.S. Cl. .................. 524/526; 524/575; 526/340
[58] Field of Search ............ 526/340; 524/575, 326; 529/496, 495, 847

[56] References Cited

FOREIGN PATENT DOCUMENTS 0328284 8/1989 European Pat. Off. .
63-33436 2/1988 Japan .
1041309 9/1966 United Kingdom .
2172002 9/1986 United Kingdom .

*Primary Examiner*—Kriellion S. Morgan
*Assistant Examiner*—Peter Szekely
*Attorney, Agent, or Firm*—Oblon, Spivak, McClelland, Maier & Neustadt

[57] ABSTRACT

A rubber composition comprising 100 parts by weight of a rubber component which comprises at least 30% by weight of an emulsion polymerization rubber which is a conjugated diene polymer rubber or conjugated dienes-tyrene copolymer rubber obtained by emulsion polymerization, has a bound styrene content of 0-65% by weight, contains 20-35% by weight of a component having a molecular weight of not more than 150,000 as measured by a gel permeation chromatography and has a Mooney viscosity, $ML_{1+4}(100°\ C.)$, of 60-160 and a Mooney viscosity difference ($\Delta MV$) of $-20$ to $+5$ as defined by the following equation:

$$\Delta MV = ML_{1+4}(100°\ C.) - ML_{1+15}(100°\ C.)$$

and 45-200 parts by weight of carbon black. Said rubber composition is excellent in abrasion resistance, breaking strength and high histeresis property in uses in which carbon black or oil is blended at a high-filling rate.

6 Claims, No Drawings

PROCESS FOR PREPARING A RUBBER COMPOSITION HAVING TWO DIFFERENT MOLECULAR WEIGHTS

This application is a continuation of application Ser. No. 07/540,278, filed on Jun. 19, 1990, now abandoned.

This invention relates to a rubber composition. More particularly, it relates to a rubber composition which exhibits excellent abrasion resistance, breaking strength and high histeresis properties in uses in which carbon black or an oil is generally blended in a high filling rate such as the tread of a high performance tire and a racing tire.

In high performance tires, racing tires and the like, the operation stability and braking property during running have heretofore been enhanced by using the optimum kind and amount of carbon or oil. In fact, the amount of carbon or oil blended into tires in these uses is considerably larger than the amount of carbon blended into tires for general passenger cars, and a high structure carbon has been used in the former. These measures are applied for the purpose of enhancing the tire grip performance, namely, operation stability and braking property.

However, the above measures are now considered to have already reached a certain level from the viewpoint of technical improvement for achieving the enhancement of performance. The reason therefor is that in the prior art, such means as use of high structure carbon or an increase of the amount of carbon or oil brings about a bad dispersion of carbon consequently this results in a remarkable reduction of breaking strength, abrasion resistance and the like. This is in an antinomic relation to enhancement of grip performance. Accordingly, a technique for solving the antinomic problem has been expected; however, no such technique has been disclosed so far.

The present inventors have made extensive studies to find that a rubber component comprising at least 30% by weight of an emulsion polymerization rubber having a bound styrene content of 0 to 65% by weight, containing 20 to 35% by weight of a component having a molecular weight of not more than 150,000 as measured by a gel permeation chromatography (GPC) and having a Mooney viscosity, $ML_{1+4}(100°\ C.)$, of 60 to 160 and a Mooney viscosity difference ($\Delta MV$) of $-20$ to $+5$ is very effective to solve the above problems.

The $\Delta MV$ referred to herein means a value determined from the following equation:

$$\Delta MV = ML_{1+4}(100°\ C.) - ML_{1+15}(100°\ C.).$$

When the rubber component mentioned above is kneaded with carbon black, the black incorporation time (hereinafter referred to as B.I.T.), which is much longer than that of the composition obtained by kneading a conventional emulsion polymerization SBR with carbon, is observed on a chart of the electric power consumed. Usually, when the B.I.T. is long, the dispersion of carbon is bad, and as a result, physical properties of kneaded product such as breaking strength, abrasion resistance and the like are deteriorated. This has heretofore been common knowledge among those skilled in the art. However, the extensive research of the inventors of this invention has clarified that some specific rubber compositions, in spite of indicating a long B.I.T. during kneading, are better in such physical properties as breaking strength and abrasion resistance than other conventional rubber compositions indicating a short B.I.T. Particularly, at a high carbon-filling rate, the physical properties of the specific rubber compositions are greatly enhanced.

According to this invention, there is provided a rubber composition comprising 100 parts by weight of a rubber component which comprises at least 30% by weight of an emulsion polymerization rubber which is a conjugated diene polymer rubber or conjugated diene-styrene copolymer rubber obtained by emulsion polymerization, has a bound styrene content of 0 to 65% by weight, contains 20 to 35% by weight of a rubber component having a molecular weight of not more than 150,000 as measured by GPC and has a Mooney viscosity, $ML_{1+4}(100°\ C.)$ of 60 to 160 and a Mooney viscosity difference ($\Delta MV$) of $-20$ to $+5$ as defined by the following equation:

$$\Delta MV = ML_{1+4}(100°\ C.) - ML_{1+15}(100°\ C.)$$

and 45 to 250 parts by weight of carbon black.

The emulsion polymerization rubber used in the rubber composition of this invention is produced by polymerizing a conjugated diene or copolymerizing a conjugated diene and styrene. More specifically, it can be produced by initiating the (co)polymerization in the presence of a small amount of a molecular weight regulator (for example, 0.02 to 0.16 phr of t-dodecylmercaptan) to polymerize 40 to 65% by weight of the monomer or monomers, thereafter adding a relatively large amount of a molecular weight regulator (for example, 0.08 to 0.18 phr of t-dodecylmercaptan) and continuing the (co)polymerization until the polymerization conversion reaches a desired level (for example, 60 to 80%).

In this case, a high molecular weight rubber is formed in the polymerization zone before the addition of a molecular weight regulator, and a low molecular weight rubber is formed in the polymerization zone after the addition of the molecular weight regulator. As a result, the final product has a broader molecular weight distribution than conventional emulsion polymerization rubbers. Of course, on the contrary, it is possible to form a low molecular weight rubber in the former stage by initiating the (co)polymerization in the presence of a relatively large amount of a molecular weight regulator and then forming a high molecular weight rubber in the latter stage by adding a large amount of the monomer or monomers to continue the (co)polymerization. The two methods have the same effect of this invention; however, the latter method requires a larger reactor and this is disadvantageous. In the former method, an additional monomer or monomers can be added simultaneosuly with the addition of a molecular weight regulator for the purpose of adjusting the composition of monomers to be copolymerized after the addition of a molecular weight regulator to any desired composition. In the latter method, on the other hand, an additional molecular weight regulator can be added simultaneously with the addition of the monomers for the purpose of preventing gel-formation or controlling the molecular weight. In both the methods, when the molecular weight regulator is present in an amount enough to prevent the gel formation, it is possible to increase the final conversion to, for example, more than 80%.

The emulsion polymerization rubber used in the rubber composition of this invention can also be produced by polymerizing the monomer or monomers in the presence of a relatively large amount of a molecular weight regulator until the polymerization conversion reaches, for example, 80% or more.

The emulsion polymerization rubber thus obtained has a bound styrene content of 0 to 65% by weight, contains 20 to 35% by weight, preferably 20 to 30% by weight of a rubber component having a polystyrene-reduced molecular weight of not more than 150,000 as measured by GPC, has a Mooney viscosity, $ML_{1+4}(100°\ C.)$ of 60 to 160 and has a Mooney viscosity difference $\Delta MV$ as defined above of $-20$ to $+5$.

It is possible to obtain a rubber having a bound styrene content of more than 65% by weight; however, the final rubber composition containing such a rubber cannot satisfactorily exhibit the effect of this invention in respect of abrasion resistance and grip performance. The bound styrene content is preferably 5 to 60% by weight.

The emulsion polymerization rubber used in the rubber composition of this invention has a Mooney viscosity difference, $\Delta MV$ of $-20$ to $+5$, preferably $-20$ to 0. When the $\Delta MV$ is smaller than $-20$ the rubber gels during kneading with carbon black and the physical properties of the rubber composition of this invention are greatly deteriorated. When the $\Delta MV$ exceeds $+5$, the grip performance and abrasion resistance of the rubber composition cannot be sufficiently improved particularly at a high carbon-filling rate, though such a rubber is satisfactory in respect of other properties.

The emulsion polymerization rubber used in the rubber composition of this invention has a Mooney viscosity, $ML_{1+4}(100°\ C.)$ of 60 to 160, preferably 70 to 160. When the Mooney viscosity is less than 60, the grip performance and abrasion resistance of the rubber composition of this invention cannot be satisfactorily improved at a high carbon-filling rate though such a rubber is satisfactory in respect of other properties. When the Mooney viscosity exceeds 160 the rubber gels during kneading with carbon black and becomes unusable.

The conjugated diene to be used in the emulsion polymerization in this invention is not critical and includes 1,3-butadiene, 2,3-dimethylbutandiene, isoprene, chloroprene, 1,3-pentadiene, hexadiene, myrcene and the like. 1,3-Butadiene is preferred.

The rubber component in the composition of this invention may comprise other rubber component than the emulsion polymerization rubber used in the rubber composition of this invention. Said other rubber component includes other styrene-butadine rubbers, polyisoprene, low cis-1,4-polybutadiene, high cis-1,4-polybutadiene, ethylene-propylene rubber, chloroprene rubber, (halogenated) butyl rubber, NBR, NIR, natural rubber and the like. These are illustrative and not limitative. In the rubber composition of this invention, it is necessary for the rubber component to contain at least 30% by weight, preferably 40 to 75% by weight, of the emulsion polymerization rubber used in the rubber composition of this invention. When the content of the emulsion polymerization rubber is less than 30% by weight, the abrasion resistance and breaking strength become unsatisfactory and the effect of this invention cannot be achieved.

The emulsion polymerization rubber to be used in this invention may, if necessary, be oil-extended in the form of a latex. The oil which can be used in the oil-extension is not critical, and preferable is an aromatic oil having a viscosity-specific gravity constant (V.G.C.) of at least 0.95.

In this invention, the amount of carbon black blended is 45 to 250 parts by weight, preferably 70 to 200 parts by weight, per 100 parts by weight of the rubber component. When it is less than 45 parts by weight, the reinforcibility is unsatisfactory and the abrasion resistance is insufficient. On the other hand, when it exceeds 250 parts by weight, the viscosity of the resulting blend increases, and hence, the reinforcibility becomes low and the abrasion resistance becomes unsatisfactory. Moreover, an extender oil may be incorporated when the rubber is kneaded with a filler.

The rubber composition of this invention may further contain, if necessary, a conventional compounding agent, for example, a filler such as magnesium carbonate, calcium carbonate, silica, glass fiber, aramid fiber and the like; stearic acid; zinc white; antioxidant; vulcanization accelerator; and the like.

The rubber composition of this invention can be subjected to molding and thereafter vulcanization and then used in tire uses such as tread, undertread, side wall, bead portion and the like and industrial articles such as hose, belt, shoe sole, window flame, sealing material, rubber for vibration insulation and the like.

This invention is further explained in more detail below referring to Examples which are merely by way of illustration and not by way of limitation.

EXAMPLES 1 TO 8 AND COMPARATIVE EXAMPLES 1 TO 8

(1) Production of copolymer rubber latex

| Polymerization recipe | Part by weight |
|---|---|
| 1,3-Butadiene | Appropriately varied |
| Styrene | Appropriately varied |
| Water | 200.0 |
| Resin soap | 5.0 |
| Ferrous sulfate heptahydrate | 0.05 |
| Sodium alkylnapthalene-sulfonate | 0.15 |
| Ethylenediamine tetraacetate tetrasodium salt | 0.10 |
| Sodium formaldehyde-sulfoxylate | 0.15 |
| p-Menthane hydroperoxide | 0.10 |
| t-Dodecylmercaptan | Appropriately varied |

According to the above polymerization recipe, polymerization was conducted at a temperature of 5° C., and a polymerization terminator was added at a predetermined polymerization conversion. Thereafter, the unreacted monomers were recovered to obtain a rubber latex containing about 20% by weight of a rubbery copolymer. Incidentally, the details in each Example and each Comparative Example are as follows:

EXAMPLE 1

In a reactor were placed 44 parts by weight of 1,3-butadiene, 51 parts by weight of styrene and 0.07 part by weight of t-dodecylmercaptan, and polymerization was conducted according to the above-mentioned polymerization recipe. When the conversion reached 63%, 5 parts by weight of 1,3-butadiene and 0.1 part by weight of t-dodecylmercaptan were added and polymerization was continued until the final conversion reached 80%.

EXAMPLE 2

In a reactor were placed 43 parts by weight of 1,3-butadiene, 52 parts by weight of styrene and 0.04 part by weight of t-dodecylmercaptan, and according to the above-mentioned polymerization recipe, polymerization was conducted. When the conversion reached 52%, 5 parts by weight of 1,3-butadiene and 0.08 part by weight of t-dodecylmercaptan were added and polymerization was continuted until the final conversion reached 65%.

EXAMPLE 3

In a reactor were placed 48.5 parts by weight of 1,3-butadiene, 51.5 parts by weight of styrene and 0.16 part by weight of t-dodecylmercaptan, and polymerization was conducted according to the above-metioned polymerization recipe. The final conversion was 80%.

EXAMPLE 4

In a reactor were placed 42 parts by weight of 1,3-butadiene, 51 parts by weight of styrene and 0.04 part by weight of t-dodecylmercaptan, and polymerization was conducted according to the above-mentioned polymerization recipe. When the conversion reached 41%, 7 parts by weight of 1,3-butadiene and 0.18 part by weight of t-dodecylmercaptan were added and polymerization was continued until the final conversion reached 80%.

EXAMPLE 5

In a reactor were placed 86 parts by weight of 1,3-butadiene, 13 parts by weight of styrene and 0.16 part by weight of t-dodecylmercaptan, and polymerization was conducted according to the above-mentioned polymerization recipe. When the conversion reached 46%, 1 part by weight of styrene and 0.1 part by weight of t-dodecylmercaptan were added and polymerization was continued until the final conversion reached 62%.

EXAMPLE 6

In a reactor were placed 71 parts by weight of 1,3-butadiene, 28 parts by weight of styrene and 0.10 part by weight of t-dodecylmercaptan, and polymerization was conducted according to the above-mentioned polymerization recipe. When the conversion reached 46%, 1 part by weight of styrene and 0.1 part by weigh of t-dodecylmercaptan were added and polymerization was continued until the final conversion reached 62%.

EXAMPLE 7

In a reactor were placed 29 parts by weight of 1,3-butadiene, 66 parts by weight of styrene and 0.02 part by weight of t-dodecylmercaptan, and polymerization was conducted according to the above-mentioned polymerization recipe. When the conversion reached 61%, 5 parts by weight of 1,3-butadiene and 0.1 part by weight of t-dodecylmercaptan were added and polymerization was continued until the final conversion reached 80%.

EXAMPLE 8

In a reactor were placed 44 parts by weight of 1,3-butadiene, 51 parts by weight of styrene and 0.04 part by weight of t-dodecylmercaptan, and polymerization was conducted according to the above-mentioned polymerization recipe. When the conversion reached 62%, 5 parts by weight of 1,3-butadiene and 0.12 part by weight of t-dodecylmercaptan were added and polymerization was continued until the final conversion reached 80%.

COMPARATIVE EXAMPLE 1

In a reactor were placed 15 parts by weight of 1,3-butadiene, 80 parts by weight of styrene and 0.02 part by weight of t-dodecylmercaptan, and polymerization was conducted according to the above-mentioned polymerization recipe. When the conversion reached 63%, 5 parts by weight of 1,3-butadiene and 0.1 part by weight of t-dodecylmercaptan were added and polymerization was continued until the final conversion reached 80%.

COMPARATIVE EXAMPLE 2

In a reactor were placed 46.5 parts by weight of 1,3-butadiene, 53.5 parts by weight of styrene and 0.06 part by weight of t-dodecylmercaptan, and polymerization was conducted according to the above-mentioned polymerization recipe. The final conversion was 60%.

COMPARATIVE EXAMPLE 3

In a reactor were placed 46.5 parts by weight of 1,3-butadiene, 53.5 parts by weight of styrene and 0.10 part by weight of t-dodecylmercaptan, and polymerization was conducted according to the above-mentioned polymerization recipe. The final conversion was 60%.

COMPARATIVE EXAMPLE 4

In a reactor were placed 42 parts by weight of 1,3-butadiene, 51 parts by weight of styrene and 0.04 part by weight of t-dodecylmercaptan, and polymerization was conducted according to the above-mentioned polymerization recipe. When the conversion reached 74%, 7 parts by weight of 1,3-butadiene and 0.1 part by weight of t-dodecylmercaptan were added and polymerization was continued until the final conversion reached 90%.

COMPARATIVE EXAMPLE 5

In a reactor were placed 46.5 parts by weight of 1,3-butadiene, 53.5 parts by weight of styrene and 0.6 part by weight of t-dodecylmercaptan, and polymerization was conducted according to the above-mentioned polymerization recipe until the final conversion reached 70% to obtain a liquid rubber latex. The liquid rubber latex was mixed with the latex obtained in Comparative Example 2 in a weight ratio of 37.5:10.0 in terms of solid rubber weight.

COMPARATIVE EXAMPLE 6

Polymerization was conducted in the same manner as in Comparative Example 2.

COMPARATIVE EXAMPLE 7

In a reactor were placed 42 parts by weight of 1,3 butadiene, 51 parts by weight of styrene and 0.04 part by weight of t-dodecylmercaptan, and polymerization was conducted according to the above-mentioned polymerization recipe. When the conversion reached 33%, 7 parts by weight of 1,3-butadiene and 0.15 part by weight of t-dodecylmercaptan were added, and polymerization was continued until the final conversion reached 80%.

COMPARATIVE EXAMPLE 8

In a reactor were placed 41 parts by weight of 1,3-butadiene, 51 parts by weight of styrene and 0.04 part by weight of t-dodecylmercaptan, and polymerization was conducted according to the above-mentioned polymerization recipe. When the conversion reached 40%, 8 parts by weight of 1,3-butadiene and 0.9 part by weight of t-dodecylmercaptan were added, and polymerization was continued until the final conversion reached 80%.

The bound styrene content of the copolymer latex or copolymer latex mixture obtained and the content of copolymer component having a polystyrene-reduced molecular weight of not more than 150,000 as measured by GPC are shown in Table 1.

Incidentally, the bound styrene content of the copolymer was measured with ¹H-NMR under the following conditions:

| | |
|---|---|
| Kind of machine: | FX-100 |
| Solvent: | Carbon tetrachloride |
| Sample concentration: | 2.5% by weight |
| Measurement temperature: | 50° C. |
| Standard substance: | Tetramethylsilane |

In the GPC, ALC-GPC manufactured by Waters in U.S. was used with a differential refractometer as a detector and the following measurement conditions were used:

| | |
|---|---|
| Column: | Column GMH3, BMH6 and G6000h6 manufactured by Toyo Soda which were connected in series. |
| Transfer phase: | Tetrahydrofuran (flow rate: 1.0 ml/min) |
| Charged sample concentration: | 0.2 |
| Charged amount: | 1 ml. |
| Measurement temperature: | Room temperature |

Incidentally, the content of the component having a polystyrene-reduced molecular weight of not more than 150,000 was determined from the ratio of the two areas obtained by dividing the GPC chart by the count number corresponding to a polystyrene-reduced molecular weight of 150,000 determined using a calibration curve drawn by previously determining the relation between the GPC count number and the molecular weight at peak of a monodisperse styrene polymer by GPC using a monodisperse styrene polymer manufactured by Waters.

(2) Preparation and evaluation of rubber composition

The latex obtained in (1) above was subjected to coagulation by a conventional acid-salt coagulation method, washed with water and then dried to obtain 8 kinds of rubbers of the Examples and 8 kinds of rubbers of the Comparative Examples. However, only in Comparative Example 6, oil extension was effected in the form of latex. In the oil extension, 37.5 phr of an aromatic oil was used.

These rubber compositions were subjected to kneading according to the following compounding recipe by means of a Banbury mixer or a roll and press-vulcanized under the following vulcanization conditions to prepare vulcanized rubber samples:

| Compounding recipe | part by weight |
|---|---|
| Rubber composition | 137.5 |
| Zinc white | 3 |
| Stearic acid | 2 |
| Carbon black | 100 |
| Aromatic oil [JSR AROMA (V.G.C. = 0.97)] | 46* |
| Vulcanization accelerator (dibenzothiazyl disulfide 1.2 parts and diphenylguanidine 0.6 part) | 1.8 |
| Antioxidant (N-phenyl-N'-isopropyl-p-phenylenediamine) | 1.8 |
| Sulfur | 1.5 |

| Compounding recipe | part by weight |
|---|---|
| Vulcanization conditions | 155° C. × 30 min. |

Note: *Only in Comparative Example 6, the amount of the aromatic oil compounded was 32.5 parts by weight.

The vulcanized rubber sample thus obtained was subjected to the following test for properties:

(i) Physical properties in normal state (measured according to JIS K6301)

300% modulus (kgf/cm$^2$)

Tensile strength (kgf/cm$^2$)

(ii) Abrasion resistance (DIN abrasion resistance index)

Measured according to the DIN Abrasion Test Method (according to DIN 35516)

The abrasion resistance in Comparative Example 5 is assumed as 100 and indexes thereto are used.

(iii) Dry skid index

Dry skid was measured using a portable skid tester manufactured by British Road Research Laboratory. In this test, asphalt was used as the test road surface.

(iv) Wet skid index

Measured in the same method as in the measurement of dry skid, except that the asphalt road surface was sufficiently wetted with water. The wet skid in Example 5 is assumed as 100 and indexes thereto are used.

The results of the above test for properties are shown in Table 1.

From Table 1, the following can be understood:

As shown in Comparative Example 1, when the bound styrene content of the emulsion polymerization rubber exceeds 65% by weight, abrasion resistance is inferior and grid performance is also insufficient.

In Comparative Example 2, the content of the component having a polystyrene-reduced molecular weight of not more than 150,000 as measured by GPC is less than 20% by weight, and therefore, abrasion resistance and grip performance are inferior.

In Comparative Example 3, the Mooney viscosity difference exceeds +5, and hence, abrasion resistance and grip performance are insufficient.

In Comparative Example 4, the Mooney viscosity difference is smaller than −20, and therefore, the compounded rubber gelled.

In Comparative Example 5, a high molecular weight emulsion polymerization rubber was mixed with a low molecular weight emulsion polymerization rubber in the form of latex and the Mooney viscosity difference exceeds +5. Therefore, abrasion resistance and grip performance are insufficient.

In Comparative Example 6, an oil-extended rubber as conventionally used in high performance tire and racing tire was used, and the amount of the extendor oil compounded was reduced for the purpose of making the vulcanizate hardness consistent with those of other samples. Comparative Example 6 is inferior in breaking strength, abrasion resistance and grip performance to the Examples.

In Comparative Example 7, the content of the low molecular weight component exceeds 35% by weight, and hence, the abrasion resistance is insufficient.

In Comparative Example 8, the Mooney viscosity of the emulsion polymerization rubber used [ML$_{1+4}$(100°

C.)] is less than 60, and hence, abrasion resistance is inferior.

On the other hand, all the Examples are superior in abrasion resistance and grip performance and can be appropriately applied to high performance tire and racing tire.

presence of a small amount of molecular weight regulator to produce a high molecular weight rubber compound, thereafter adding a relatively large amount of molecular weight regulator and continuing the polymerization to produce a low molecular weight rubber compound.

TABLE 1

|  | Example | | | | | | | |
|---|---|---|---|---|---|---|---|---|
|  | 1 | 2 | 3 | 4 | 5 | 6 | 7 | 8 |
| Bound styrene content (wt %) | 45 | 45 | 45 | 45 | 10 | 23 | 60 | 45 |
| Content of component having molecular weight of not more than 150,000 (wt %) | 25 | 22 | 24 | 31 | 24 | 25 | 21 | 22 |
| Mooney viscosity $ML_{1+4}$ (100° C.) | 93.5 | 107 | 103 | 76 | 90 | 96 | 101 | 152 |
| Mooney viscosity $ML_{1+15}$ (100° C.) | 110 | 104 | 100 | 75.5 | 108 | 110 | 98 | 152 |
| Mooney viscosity difference ($\Delta MV$) | −16.5 | +2 | +3 | +0.5 | −18 | −14 | +3 | 0 |
| (Physical properties of vulcanizate) | | | | | | | | |
| 300% Modulus (kgf/cm$^2$) | 75 | 67 | 66 | 56 | 58 | 61 | 70 | 92 |
| Tensile strength (kgf/cm$^2$) | 208 | 197 | 213 | 197 | 169 | 227 | 176 | 199 |
| DIN abrasion index | 109 | 111 | 109 | 112 | 141 | 124 | 105 | 111 |
| Dry skid index | 112 | 118 | 106 | 102 | 99 | 104 | 126 | 107 |
| Wet skid index | 116 | 104 | 108 | 100 | 94 | 103 | 97 | 108 |
|  | Comparative Example | | | | | | | |
|  | 1 | 2 | 3 | 4 | 5 | 6 | 7 | 8 |
| Bound styrene content (wt %) | 70 | 45 | 45 | 45 | 45 | 45 | 45 | 45 |
| Content of component having molecular weight of not more than 150,000 (wt %) | 22 | 17 | 22 | 21 | 30 | 17 | 37 | 33 |
| Mooney viscosity $ML_{1+4}$ (100° C.) | 101 | 152 | 113 | 150 | 91 | 70 | 74 | 46 |
| Mooney viscosity $ML_{1+15}$ (100° C.) | 99 | 151 | 102.5 | 172 | 77.5 | 63 | 70 | 43 |
| Mooney viscosity difference ($\Delta MV$) | +2 | +1 | +10.5 | −22 | +13.5 | +7 | +4 | +3 |
| (Physical properties of vulcanizate) | | | | | | | | |
| 300% Modulus (kgf/cm$^2$) | Broken | Broken | 66 | Gelled | 95 | 62 | 46 | 34 |
| Tensile strength (kgf/cm$^2$) | 186 | 192 | 213 |  | 233 | 173 | 167 | 168 |
| DIN abrasion index | 66 | 68 | 101 | Unmeasurable | 100 | 77 | 84 | 66 |
| Dry skid index | 92 | 78 | 98 |  | 100 | 86 | 100 | 97 |
| Wet skid index | 79 | 92 | 103 |  | 100 | 114 | 95 | 99 |

What is claimed is:

1. A process for preparing a rubber composition comprising:
   i) emulsion polymerizing a conjugated diene or copolymerizing a conjugated diene and styrene wherein the polymerization is initiated sequentially in the presence of alternating quantities of molecular weight regulator to sequentially produce a high molecular weight rubber compound followed by a low molecular weight compound, or visa versa, a low molecular weight rubber compound followed by a high molecular weight rubber compound; wherein the bound styrene content of the rubber obtained by emulsion polymerization is 0-65%, the content of a component having a molecular weight of 150,000 or less as measured by GPC in the rubber is 20-35%, and $ML_{1+4}$(100° C.) = 60-160;
   ii) coagulating said rubber compounds;
   iii) admixing 100 parts of said coagulated rubber compounds with 70-200 parts by weight of carbon black; and
   iv) vulcanizing the mixture of step iii).

2. The process of preparing a rubber composition of claim 1, wherein the polymerization is initiated in the presence of a relatively large amount of molecular weight regulator to form a low molecular weight rubber compound and then forming a high molecular weight rubber compound in the latter stage by adding a large amount of the monomer or monomers to continue the polymerization.

3. The process of preparing a rubber composition of claim 1 wherein the polymerization is initiated in the presence of a relatively large amount of molecular weight regulator to form a low molecular weight rubber compound and then forming a high molecular weight rubber compound in the latter stage by adding a large amount of the monomer or monomers to continue the polymerization.

4. The process of preparing a rubber composition of claim 1 wherein the conjugated diene copolymerized with styrene is selected from the group consisting of 1,3-butadiene, 2,3-dimethylbutadiene, isoprene, chloroprene, 1,3-pentadiene, hexadiene and myrcene.

5. The process of preparing a rubber composition of claim 2 wherein 40-65% by weight of the monomer or monomers is polymerized before the large amount of molecular weight regulator is added.

6. The process of preparing a rubber composition of claim 2, wherein the polymerization is initiated in the presence of 0.02-0.16 parts by weight of a molecular weight regulator, followed by adding 0.08-0.18 parts by weight of a molecular weight regulator.

* * * * *